United States Patent [19]

Usui et al.

[11] B 4,000,876
[45] Jan. 4, 1977

[54] ONE-WAY SUPPORT FOR STEERING COLUMN

[75] Inventors: Hideyuki Usui; Toshimitsu Kimura, both of Yokohama, Japan

[73] Assignee: Nissan Motor Company, Limited, Japan

[22] Filed: Nov. 4, 1974

[21] Appl. No.: 520,952

[44] Published under the second Trial Voluntary Protest Program on March 16, 1976 as document No. B 520,952.

[30] Foreign Application Priority Data

Nov. 7, 1973 Japan .......................... 48-128084

[52] U.S. Cl. ........................... 248/205 R; 74/492; 180/82 R; 280/87 R
[51] Int. Cl.² ................. F16M 13/02; B60R 21/02
[58] Field of Search ................. 248/205 R, 221, 18; 74/492; 280/87 R; 180/82

[56] References Cited

UNITED STATES PATENTS

| | | | |
|---|---|---|---|
| 3,135,224 | 6/1964 | McLean | 248/9 X |
| 3,415,140 | 12/1968 | Bien et al. | 248/221 X |
| 3,476,345 | 11/1969 | Ristau | 248/205 R X |
| 3,621,732 | 11/1971 | Kaniut | 248/221 X |
| 3,707,096 | 12/1972 | Bennett | 74/492 |
| 3,785,671 | 1/1974 | Saleinsky | 74/492 X |

*Primary Examiner*—J. Franklin Foss
*Attorney, Agent, or Firm*—Robert E. Burns; Emmanuel J. Lobato; Bruce L. Adams

[57] ABSTRACT

A support is constructed and arranged to absorb a tangential force component of an impact force applied to the steering wheel of the steering column.

1 Claim, 4 Drawing Figures

ONE-WAY SUPPORT FOR STEERING COLUMN

BACKGROUND OF THE INVENTION

The present invention relates to a "one-way" support for a steering column. So-called "one-way" supports prevent axial displacement of an upper tube portion of a steering column in the rearward direction, but provide only nominal resistance to axial displacement in the forward direction.

Such "one-way" supports exhibiting the aforementioned characteristic are already well known. Usually they have a U-section mounting strap including two ears having rearwardly open slots. The mounting strap is secured to an upper tube portion of the steering column assembly. Two hanger bolts which are fixedly suspended from the vehicle instrument panel through which the assembly is installed extend into the rearwardly open slots in the ears of the mounting strap. Nuts are tightened onto the bolts sufficiently to give firm vertical support of the upper tube portion. In another prior art case, two clamps which are fixedly suspended from the instrument panel extend into rearwardly open slots in the ears of the mounting strap to couple therewith and they are fastened with the ears by shearable plastic mouldings. Firm vertical support is thus provided.

In such conventional "one-way" supports constructed as mentioned above, application of a tangential force to the steering column assembly when the steering wheel receives an impact force in a forward direction of the vehicle, urges the mounting strap and causes the rearwardly open slots to be deformed, thereby to require application of excessively large axial force than initially designed to the steering wheel to displace the upper tube portion forwardly. Such large resistance is not favourable in lessening the danger of fatal injury to the driver upon striking against the steering wheel.

SUMMARY OF THE INVENTION

It is a principal object of the present invention to provide a "one-way" support for a steering column assembly, in which the above-mentioned drawback is avoided.

It is a further object of the present invention to provide a "one-way" support for a steering column assembly which is so constructed and arranged that a tangential force applied to the steering column assembly is absorbed and resistance to a forward displacement of the steering column assembly is low.

BRIEF DESCRIPTION OF THE DRAWINGS

The appended claims define the scope of the monopoly claimed. The invention is hereinafter particularly described with reference to the accompanying drawings in which:

DESCRIPTION OF THE PREFERRED EMBODIMENTS

Figure 1:
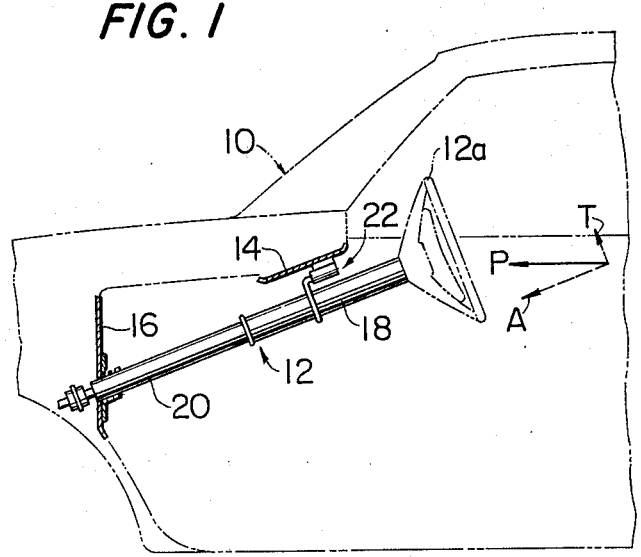
FIG. 1 is a side elevation view of a portion of a motor vehicle having a collapsible steering column the upper tube portion of which is attached to an instrument panel of the motor vehicle by a "one-way" support constructed in accordance with the present invention.

Referring now to the accompanying drawings, FIG. 1 illustrates a vehicle body 10 having a collapsible steering column 12 supported by an instrument panel 14 and fire wall 16 portions of the body 10. The steering column 12 includes an upper tube portion 18 which is telescopically engaged with a lower tube portion 20, so that the two tube portions can move relatively to one another when an impact force P is applied to the steering wheel 12a of the steering column 12.

As seen in FIG. 1, the upper portion 18 is connected to the instrument panel 14, by means of a "one-way" support 22 of the present invention.

Figure 4:
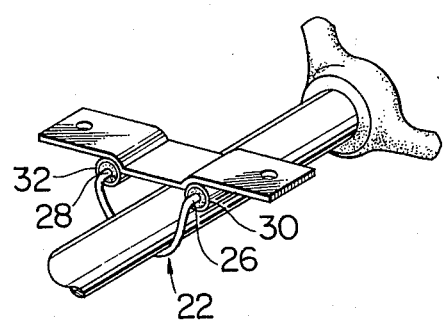
FIG. 4 is a perspective view of the "one-way" support illustrated in FIG. 1.
Figure 2:
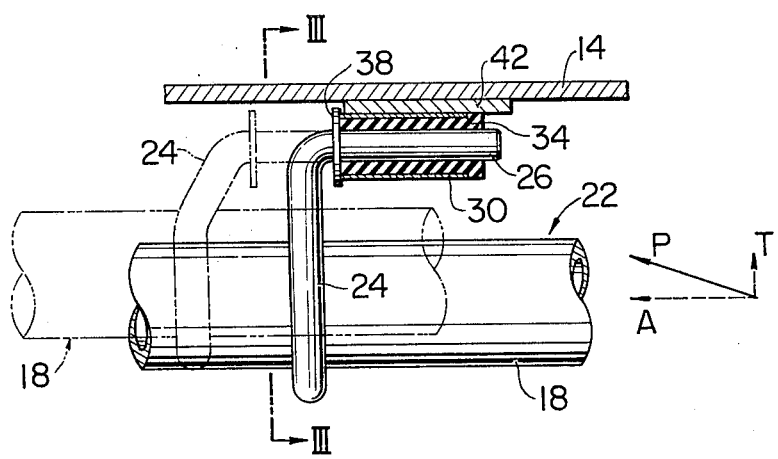
FIG. 2 is an enlarged section view of the "one-way" support for the upper tube portion of the steering column assembly.
Figure 3:
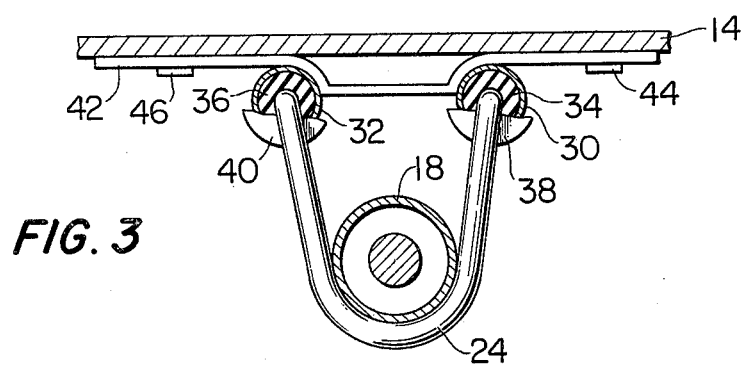
FIG. 3 is a section view taken through line III—III of FIG. 2.

As best seen in FIGS. 2–4, the "one-way" support 22 comprises a support member 24, having two prongs 26 and 28 which extend in parallel with and rearwardly of the column 12. Two collars 30 and 32 surround the two prongs 26, 28 and define therewith annular interspaces. Prestressed elastomeric sleeves 34 and 36 are positioned between the collars and the prongs in the annular interspaces, respectively.

The support member 24 is connected to the upper tube portion 18, such that the steering column is arranged upon application of an axial force A (see FIG. 1) to the assembly to cause forward displacement of the upper tube portion 18. The support member 24 is moved forwardly and causes the prongs 26 and 28 to slip forwardly out of collars 30 and 32, and upon the application of a tangential force T with respect to the axial force A, the prongs 26 and 28 compress the elastomeric sleeves 34 and 36 radially with consequent absorption of the tangential force T.

Preferably the support member 24 is so constructed and arranged that upon application of the tangential force T, the upper tube portion 18 deforms the support member 24 (see phantom lines in FIG. 2) with more efficient absorption of the tangential force.

In the embodiment illustrated in the accompanying drawings the support member 24 is in the form of a deformable rod including a generally V-section configuration (see FIG. 3) having its top portions bent rearwardly to form the prongs 26 and 28.

To prevent rearward displacement of the steering wheel 12a, the support member 24 has flanges 38 and 40 on the prongs 26 and 28 to define forward limits of the annular interspaces. The flanges of the support member serve as stop members and prevent the steering column and a steering wheel from being knocked further into the vehicle when the force of impact is so great that the steering column assembly receives a thrust from the vehicle in addition to deformation of the front part of the body (not shown) which impact force would act in the opposite direction to that indicated by the arrow P in FIG. 1.

It is preferable to integrally form or affix the collars 30 and 32 to a mount bracket 42 which will be fixed to the instrument panel 14 by means of screws 44 and 46 (see FIG. 3).

It will be understood that according to the present invention a tangential force of the impact, applied to the upper tube portion of the steering assembly is absorbed by radial compression of the elastomeric sleeves after splitting the force into two component forces. The tangential force is thus advantageously absorbed by a "one-way" support according to the present invention.

What is claimed is:

1. A "one-way" support for a steering column comprising:
    a mount bracket having fixed thereon two elongated tubular collars spaced and extending in parallel with each other;
    a support member in the form of a rod, said rod having a generally V-shaped intermediate portion and two end portions extending in the same direction from said V-shaped intermediate portion into said collars and in parallel with each other;
    said two tubular collars surrounding circumferentially said two end portions, respectively, and spaced therefrom defining therewith annular interspaces, respectively; and two prestressed elastomeric sleeves positioned between said tubular collars and said end portions in said annular interspaces, respectively; said mount bracket being supported in use on an instrumental panel of a vehicle in which a steering column assembly is installed and said V-shaped intermediate portion carrying securely thereon an upper tube portion of the steering column assembly, such that the steering column assembly thereby provides an arrangement whereby application of an axial force to the assembly in a sense tending to cause forward displacement of the upper tube portion urges said V-shaped intermediate portion forwardly and causes said end portions to slip forwardly out of said collars, and upon the application of a lateral force with respect to said axial force, said end portions compress said elastomeric sleeves radially with consequent absorption of said lateral force;
    said support member having flanges on said end portions, respectively, engaging forward ends of said tubular collars; and said rod being deformable that upon the application of said lateral force, the upper tube portion of said steering column assembly deforms said V-shaped intermediate portion with efficient absorption of said lateral force.

* * * * *